Oct. 1, 1957 C. A. LEWIS 2,808,137
CONNECTION FOR STRUCTURAL MEMBERS
Filed Nov. 24, 1952 5 Sheets-Sheet 1

INVENTOR
CARL A. LEWIS
BY Stevens, Davis, Miller & Mosher
ATTORNEYS

Oct. 1, 1957 C. A. LEWIS 2,808,137
CONNECTION FOR STRUCTURAL MEMBERS
Filed Nov. 24, 1952 5 Sheets-Sheet 2
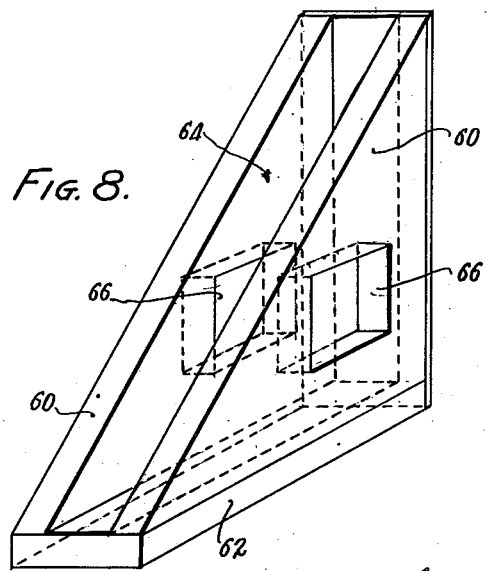
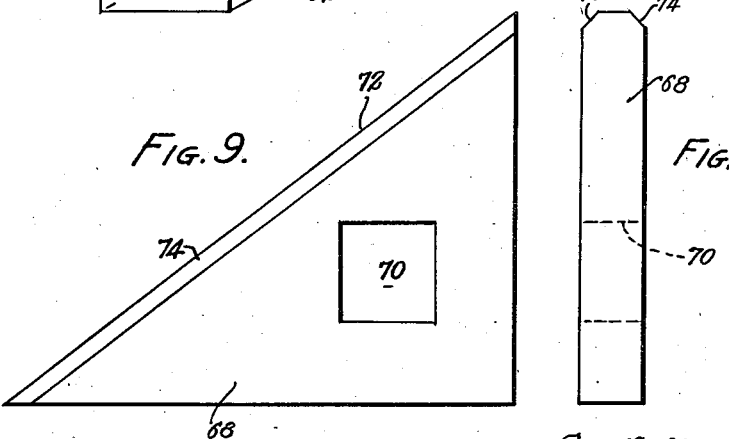
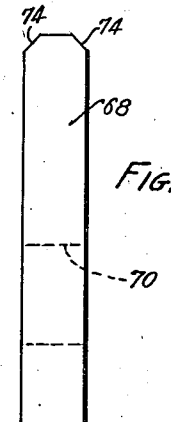
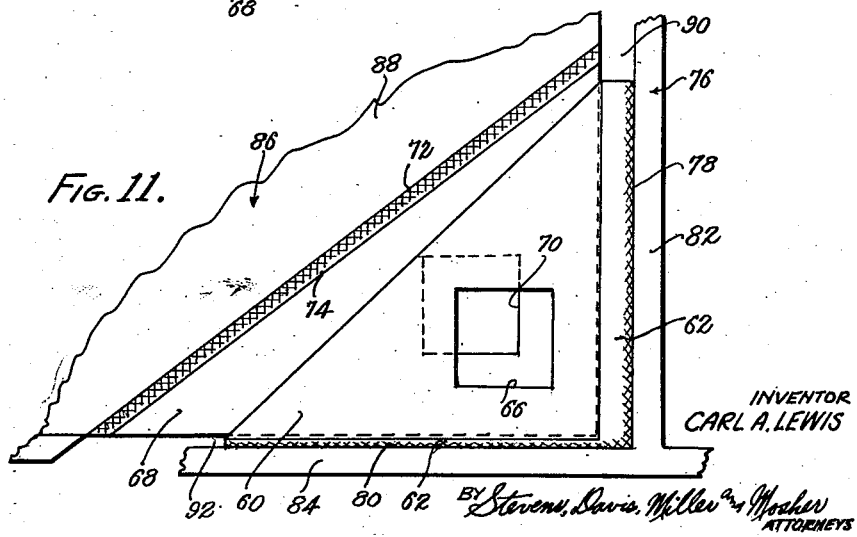
INVENTOR
CARL A. LEWIS Oct. 1, 1957 C. A. LEWIS 2,808,137
CONNECTION FOR STRUCTURAL MEMBERS
Filed Nov. 24, 1952 5 Sheets-Sheet 3
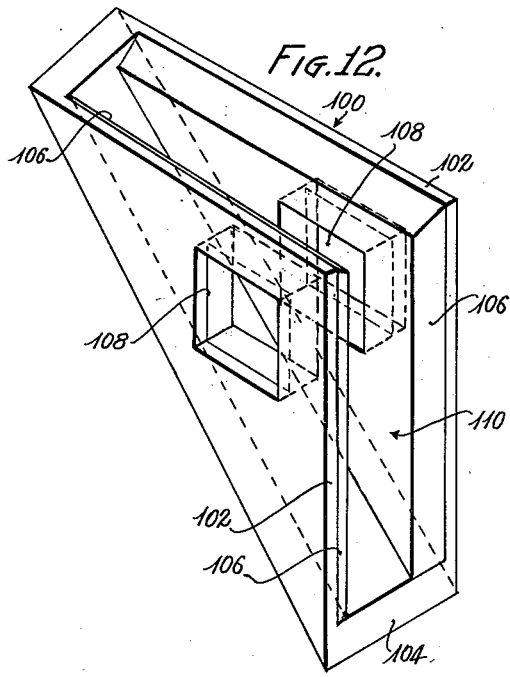
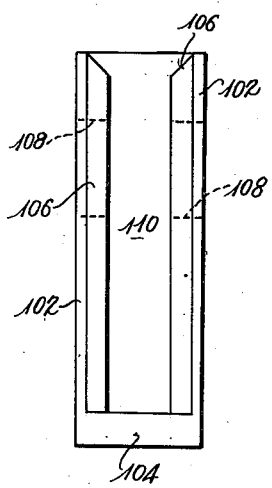
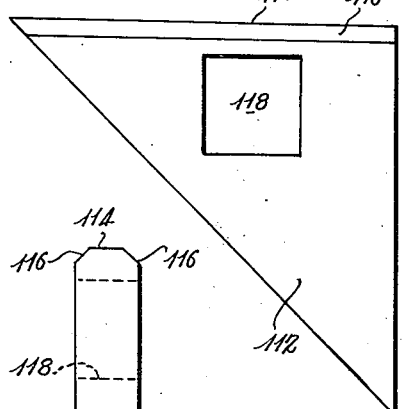
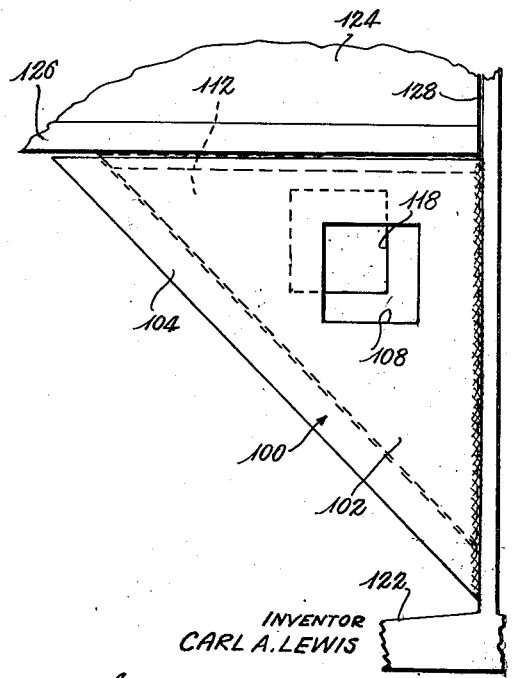
INVENTOR
CARL A. LEWIS
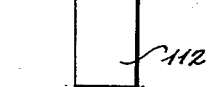
ATTORNEYS Oct. 1, 1957 C. A. LEWIS 2,808,137
CONNECTION FOR STRUCTURAL MEMBERS
Filed Nov. 24, 1952 5 Sheets-Sheet 4
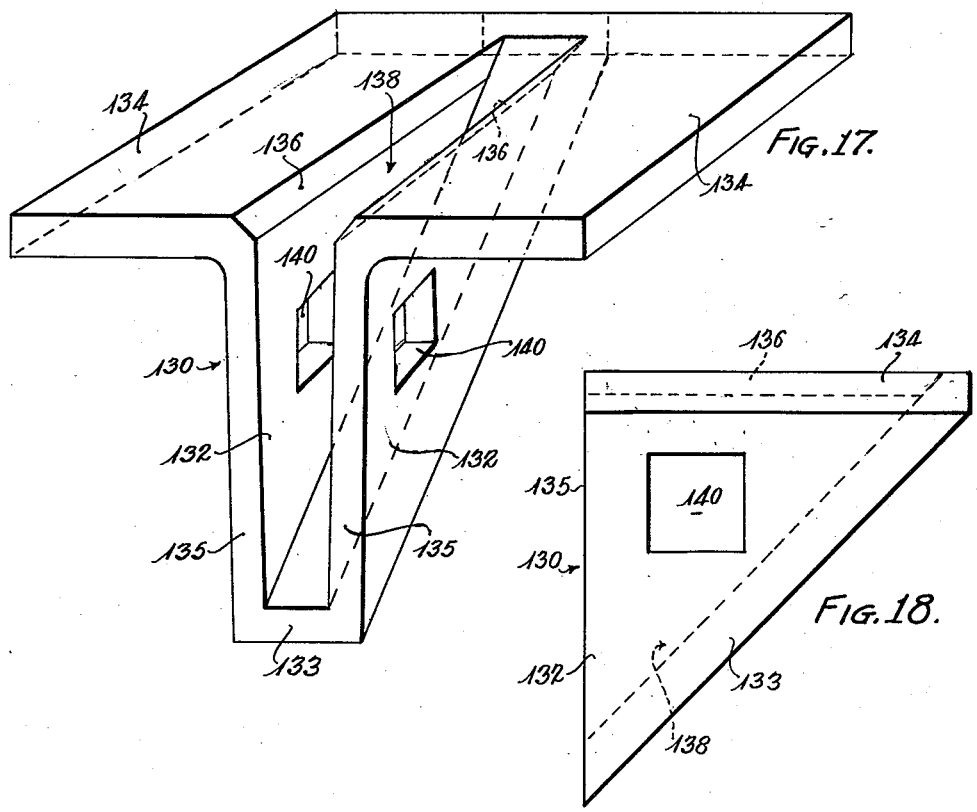
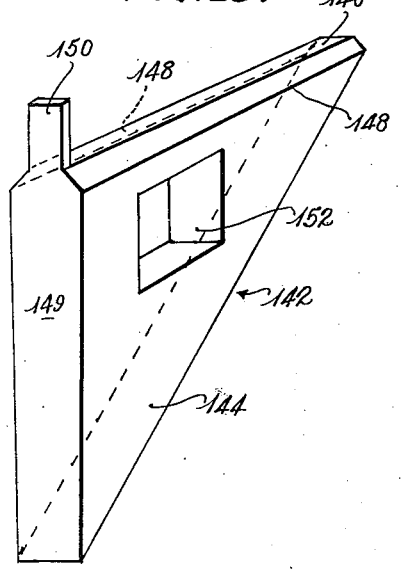
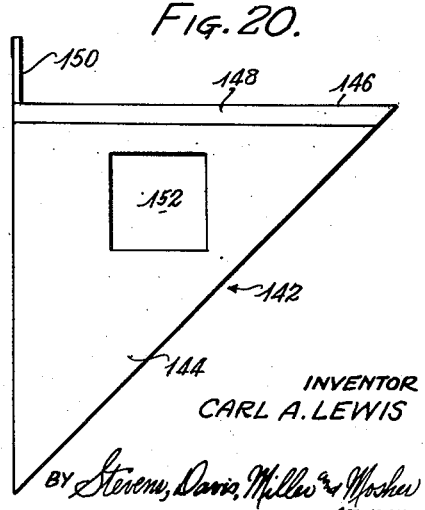
INVENTOR
CARL A. LEWIS

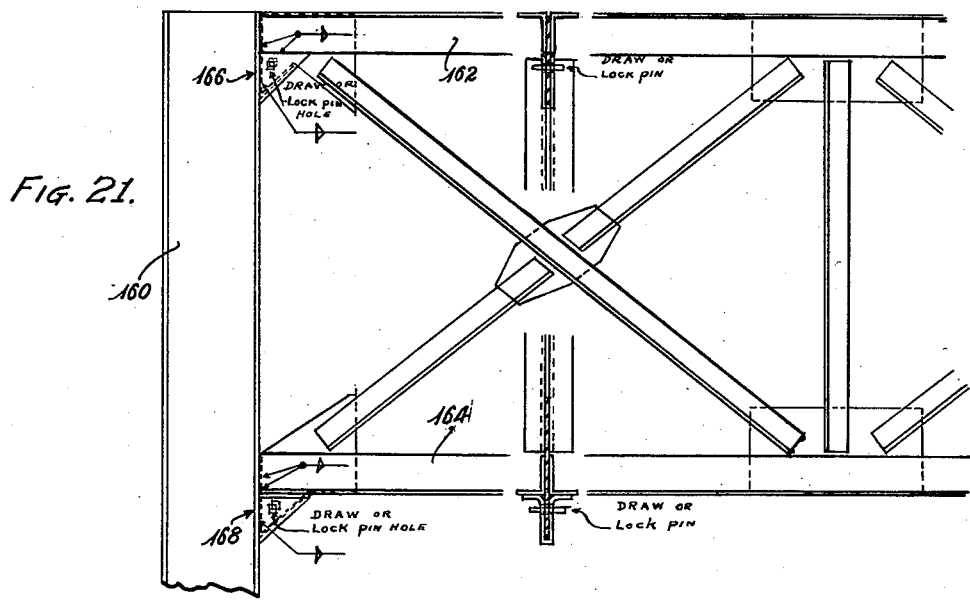
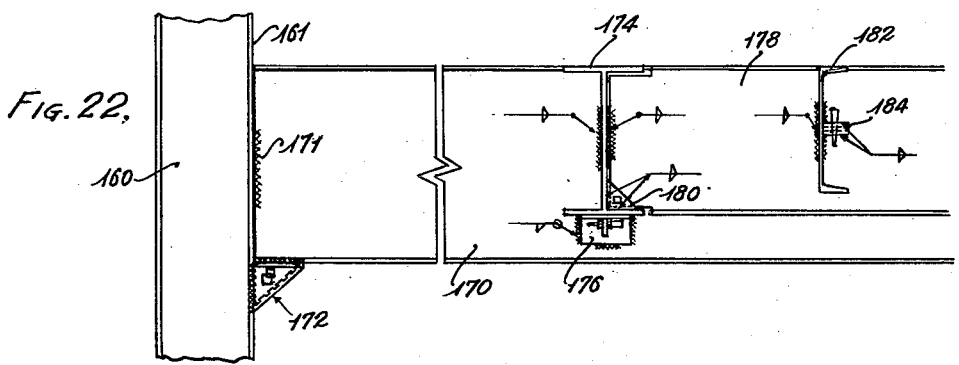
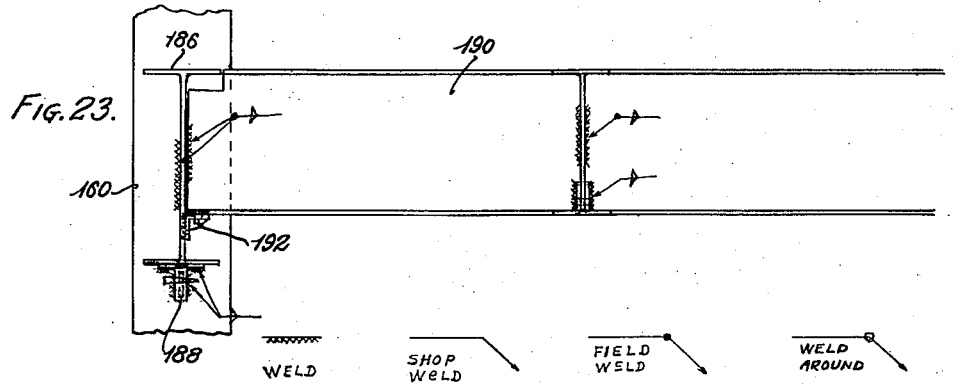

United States Patent Office 2,808,137
Patented Oct. 1, 1957

2,808,137

CONNECTION FOR STRUCTURAL MEMBERS

Carl A. Lewis, Arlington, Va.

Application November 24, 1952, Serial No. 322,293

1 Claim. (Cl. 189—36)

This invention relates to a connection for structural members which will eliminate the necessity for applying bolts and rivets to effect the connection between the members.

Heretofore connections between structural members have been effected by means of bolts or rivets and tie plates. However, much difficulty has been encountered in making proper connections because of slight irregularities in the fabricating of the structural units and the tie plates. During the fabrication the tie plates and structural members are punched to provide holes for the reception of rivets. It has been found that these holes do not always properly align when the members and tie plates are placed together, and further that many times the holes are too small to receive the desired size rivet and the holes must be reamed before the structural members could be joined. Additionally, it was found that the use of rivets introduced a serious problem of plumbing or truing of the two structural members so joined after the connection had been made. This required additional work on the job and thereby materially interfered with the progress of the work.

Accordingly, the present invention provides a connection which will eliminate the necessity of rivets and further which will permit two structural members to be readily joined in proper relation one to the other without the necessity for subsequent truing or plumbing. Additionally, it is possible to accomplish a major proportion of the work necessary for connecting the two structural members while the two structural members are on the ground. The connection of the present invention is so arranged that it is adapted to be used with any of the structural members now in use and conceivably any which will be devised in the future. Further, the connection of the present invention provides a connection which will comply with building codes and which will require no testing of parts. The simplicity of the connection of the present invention permits the joining of two structural members to be made in a considerably lesser period of time than heretofore possible with rivets.

The above features of this invention are accomplished by providing seating means to be attached as by welding to a structural member and a keying means to be attached as by welding to a second structural member. The two means cooperate with a pin or the like to join the two structural members together in proper juxtaposition without the necessity for subsequent truing or plumbing. It is therefore an object of this invention to provide a connection for structural members which will permit easy and quick assembly of the structural members in proper relation and which will secure the members in this position by locking them therein.

It is a further object of this invention to provide a connection for structural members which will eliminate the necessity of employing bolts or rivets and which will thereby eliminate the attendant noise incident to the riveting of connections.

It is a still further object of this invention to provide a connection which will permit a major portion of the work involved to be accomplished on the ground and further a connection which is more economical and more efficient than any heretofore available.

Other and further objects of this invention will become apparent from a detailed consideration of the following specification when taken in conjunction with the drawings in which:

Figure 8 is a view in perspective of a modified form of a seat member to be attached to a structural member;

Figure 9 is a view in side elevation showing a key member for use with the seat member shown in Figure 8, for attaching to a structural member;

Figure 10 is a view in end elevation showing the key member of Figure 9;

Figure 11 is a view in side elevation showing the manner in which the seat and key members of Figures 8 and 9 are brought together;

Figure 12 is a view in perspective of a still further modified form of a seat member to be mounted with a structural member;

Figure 13 is a view in end elevation of the seat member shown in Figure 12;

Figure 14 is a view in side elevation of a key member to be mounted with a structural member;

Figure 15 is a view in end elevation of the key member shown in Figure 14;

Figure 16 is a view in side elevation showing the manner in which the seat member of Figure 12 and the key member of Figure 14 are brought together;

Figure 17 is a view in perspective of a still further modified form of a seat member to be attached to a structural member;

Figure 18 is a view in side elevation of the seat member of Figure 17;

Figure 19 is a view in perspective of a key member for use with the seat member of Figure 17;

Figure 20 is a view in side elevation of the key member of Figure 19;

Figure 21 is a view in side elevation of a structural framework showing how the connections of the present invention can be utilized;

Figure 22 is a view in side elevation of a structural framework showing how the connections of the present invention can be utilized; and Figure 23 is a view in side elevation of a structural framework showing how the connections of the present invention can be utilized.

Figure 1:
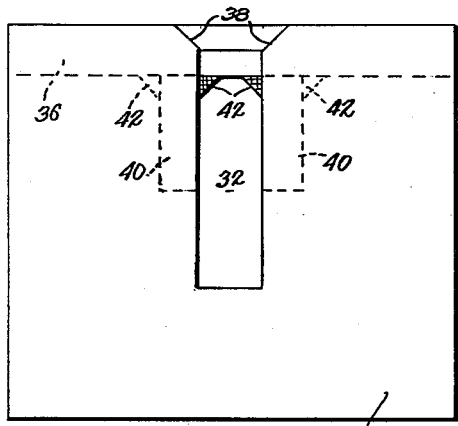
Figure 1 is a view in front elevation showing a seat for mounting with a structural member.
Figure 2:
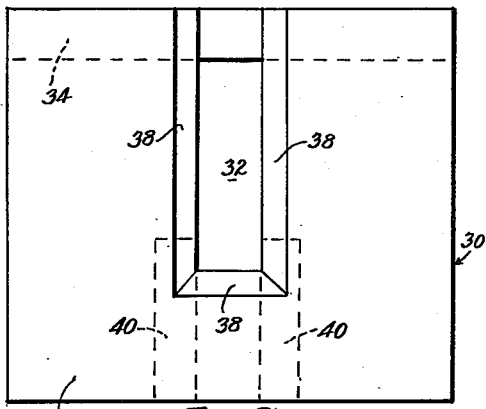
Figure 2 is a view in top plan showing the seat member of Figure 1.
Figure 3:
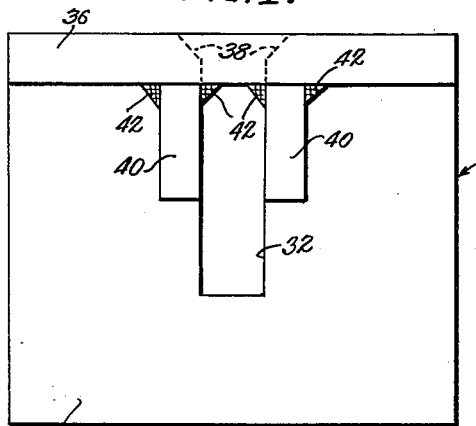
Figure 3 is a view in rear elevation showing the seat member of Figure 1.
Figure 4:
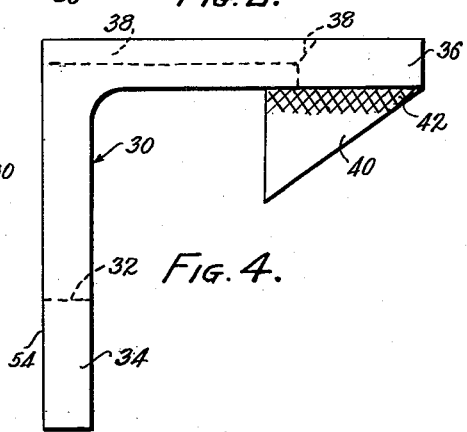
Figure 4 is a view in side elevation showing the seat member of Figure 1.
Figure 5:
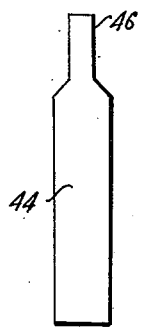
Figure 5 is a view in end elevation showing a key member for mounting with a structural member.
Figure 6:
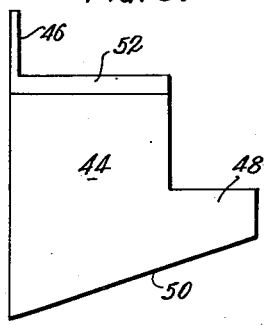
Figure 6 is a view in side elevation showing the key member of Figure 5.
Figure 7:
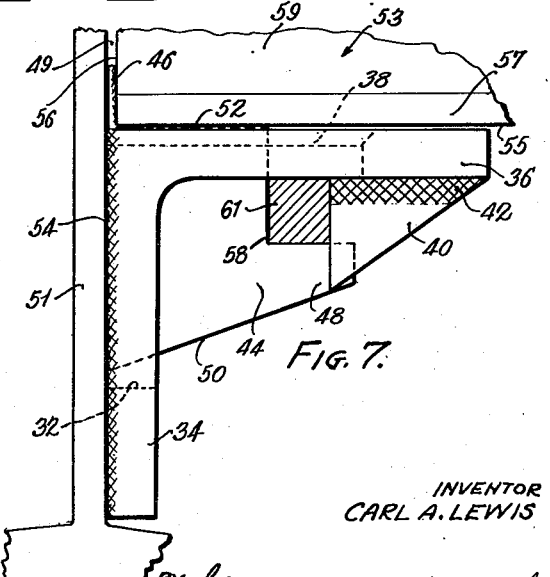
Figure 7 is a view in side elevation illustrating the manner in which the key member is fitted within the seat member.

Referring now to the drawings, Figures 1, 2, 3 and 4 illustrate a seat member for mounting with a structural member. A main body member 30 of right-angle section is provided with a slot 32 centrally located. The member 30 has a side leg 34 and a top leg 36. The edges of the top leg 36 adjacent the slot 32 are beveled as indicated at 38. Two angle pieces 40 in the form of triangular plates are welded on the bottom surface of the top leg 36 so that their inner edges 42 lie on either side of slot 32. The weld 42 indicates the connection between pieces 40 and the top leg 36. The key 44 for use with the seat shown in Figures 1 through 4 inclusive is shown in Figures 5 and 6. It consists of an element having an upper projection 46 and a side projection 48. The lower edge of this element is cut on a bias as indicated by 50. To arrange the seat 30 and the key 44 to connect two structural members, the following procedure can be adopted with reference to Figure 7. The outside surface 54 of leg 34 is welded to the web of a structural member 51 such as an I beam. In this manner the top leg 36 projects outwardly. The key 44 is welded to a second structural member 53 such as an I beam in the following manner. The surface 52 of the key is centrally welded to the outside surface 55 of the lower flange 57. The projection 46 is welded along the end 56 of the I beam to the flange 57 and the web 59. Thereafter, the two structural members can be connected together by manipulating them to place the key 44 in the seat in the position shown in Figure 7. To accomplish this, the structural member 53 holding the key 44 is brought near the structural member 51 holding the seat 30 and thereafter the structural member 53 and key 44 are lowered so that the key 44 drops into the slot 32. The mating of key 44 and seat 30 results in a draw pin hole 58 by the cooperation of pieces 40 of seat 30 and projection 48 of key 44. If desired, a draw pin can be inserted in this hole to more securely fasten the connection. It will be noted that projection 46 spaces the member 53 from member 51 as indicated at 49. To further strengthen the connection, a weld can be applied to the members in this space. If a taper draw pin 61 square in cross section is employed as shown in Figure 7 in cross section, its insertion into the draw pin hole will tend to draw the key 44 into the seat 30 and will result in the key 44 being tightly retained in the seat 30. The relationship of the draw pin 61 to the remaining structure is demonstrated quite clearly in Figures 21–23.

In Figure 8 is shown a modified seat member for attachment to a structural member. It consists of two right triangular elements 60 mounted on a right angle bar member 62. The two elements 60 are spaced apart on the bar member 62 to define therebetween a slot 64. Each of the side members 60 is provided with a square hole formed therein designated as 66. In Figures 9 and 10 is shown a key member 68 to be attached to a structural member which is to be connected to the structural member having the seat member mounted thereon. The key member 68 is of generally right triangular shape and is provided with a square hole 70 extending therethrough. The edge 72 forming the hypotenuse of the key member 68 is beveled on both sides as indicated at 74. The manner in which the seat member of Figure 8 and the key member 68 of Figures 9 and 10 is utilized is shown in Figure 11. The seat member can be attached to a structural member such as an I beam 76 by welding the outside surfaces 78 and 80 of the bar member 62 of the seat to the web 82 and the lower flange 84 of the structural member 76 respectively. The edge 72 of the key member 68 can be welded to a second structural member 86 by cutting the web 88 thereof to the same angle as edge 72 of the key member 68. The beveled sides 74 of the edge 72 permits the web 88 of the member 86 to be readily welded thereto. Thereafter, the member 86 holding the key 68 is brought near the member 76 on which is mounted the seat. The member 86 and key 68 are then dropped into position by having the key 68 falling into the slot 64 in the seat. The structural members are then in the position shown in Figure 11. It is to be noted that the hole 70 of the key 68 and the holes 66 of the seat do not completely align, but they do overlap. The portions of the aforesaid holes which do overlap form a bore square in cross section through the key 68 and seat. This can be utilized as a draw pin hole. A square draw pin can be inserted through this draw pin hole to more securely retain the connection. By utilizing a tapered square draw pin, it is important to note that as it is forced into the draw pin hole it will tend to draw the key member 68 into the seat and retain it therein tightly. This results in properly connecting the two structural members in trued relation and eliminates the necessity of subsequent effort to insure the proper connection. The right angle bar member 62 of the seat spaces the structural member 86 from the structural member 76 as indicated by 90 and 92. If desired, the connection between the two members can be further strengthened by applying a weld to these spaces.

A still further modified form of a seat to be used with structural members is illustrated in Figures 12 and 13. As shown, the seat 100 consists of a pair of right angle elements 102 mounted on a straight bar element 104. The inner edges of the elements 102 are beveled as indicated at 106. Each of the elements 102 is provided with a square hole 108. These holes 108 are aligned. The two elements 102 are mounted on the bar 104 in spaced relation and define therebetween a slot 110. The key for use with the seat 100 shown in Figures 12 and 13 is illustrated in Figure 14. This key 112 consists of an element of right triangular shape. The edges of one side 114 of the element 112 are beveled as indicated at 116. The key 112 is further provided with a square hole 118.

In order to utilize the seat 100 and the key 112, reference should be had to Figure 16. The seat 100 is welded to a structural member such as an I beam indicated as 122, by affixing it to the web of the I beam so that the slot 110 opens upward. To accomplish this, one side of the right angle elements 102 of the seat is welded to the web of the structural member 122. The key 112 is welded to a second structural member 124 by affixing it centrally to the lower surface of the lower flange 126 of the member 124. Thereafter, the two structural members are brought into proper relation so that the key 112 can be dropped into the slot 110 of the seat 100. The connection is now in the condition shown in Figure 16. It will be noted that the hole 118 of the key 112 does not properly align with the square holes 108 in the seat 100. Rather, the holes simply overlap. This overlapping of the holes forms a square draw pin hole through the seat and key members. The two structural members can be secured by the insertion of a tapered square draw pin in the draw pin hole so formed. In doing so, the square draw pin serves to draw the key 112 into the seat 100 and retains it there tightly. If desired, the member 122 can be welded to the member 124 at the point indicated as 128 to further strength the connection.

Another modified form of a seat for use in connecting structural members is shown in Figures 17 and 18. Here the seat 130 consists of two right triangular elements 132 fixed on a straight bar 133. Each of the elements 132 is provided with a flat flange member 134. Further, the top edges of the elements 132 are beveled as indicated at 136. The elements 132 are mounted on the bar 133 to define therebetween a slot 138. The elements 132 are also provided with square holes 140 which are aligned. The key for use with the seat 130 illustrated in Figures 17 and 18 is shown in Figures 19 and 20. The key 142 consists of a right triangular element 144. One edge 146 of the key 142 is beveled on each side as indictaed at 148. A projection 150 extends from the edge 149 of the element 144. The key 142 is also provided with a square hole 152.

The seat and key assembly above described is very useful with heavy structural shapes. With respect to a connection between two such structural members, the seat 130 is connected to one of the structural members such as an I beam as follows: The edges 135 of the elements 132 are welded to the web of the structural member so that the slot 138 opens upwardly and outwardly. The edge 146 of the key 142 is centrally welded to the outside surface of the lower flange of a second structural member. The projection 150 is welded along the end of the structural member to the flange and the web. This is similar to the way in which the key of Figures 5 and 6 is mounted with a structural member. Thereafter, the two structural members are brought into close proximity and the key is dropped into the slot 138. The hole 152 of the key 142 and the holes 140 of the seat 130 do not properly align but overlap. This overlapping permits a tapered square draw pin to be inserted into and through the seat and key. Insertion of a draw pin tends to bring the seat and key together and more securely retains the key in the seat. If desired, as previously mentioned, the structural members when in this condition can be welded together at any point or points where it is feasible. It is to be noted in this particular key-seat arrangement that the flanges 134 of the seat 130 provide a large area for the reception of the lower flange of the second structural member holding the key 142. This provides greater stability and also permits the seat to carry a greater load.

Figure 21 illustrates how the various embodiments of the present invention can be utilized to effect a connection between structural elements. A column 160 such as an I beam has connected to its upper end a beam 162. This connection 166 is effected by means of the seat member of Figures 12 and 13 and the key member of Figures 14 and 15 in the manner previously described. Similarly a second beam 164 is connected to the lower end of column 160 as indicated at 168.

In Figure 22 the column 160 has connected to one flange 161 a beam 170 by use of the seat and key members of Figures 12–15 inclusive. This connection 172 can be further strengthened by welding the web of beam 170 to the flange 161 as indicated at 171. A cross beam 174 is connected to the beam 170 by means of seat and key members of Figures 1–6 inclusive. This connection 176 is effected in the manner described in conjunction with Figure 7. To the cross beam 174 is connected a second beam 178 by the connection described in conjunction with Figure 11. This connection is designated as 180. A U-beam 182 is connected to the second beam 178 by means of the connection shown and described in conjunction with Figure 16. This connection is indicated as 184.

In Figure 23 the web of column 160 is connected to a cross beam 186. This connection 188 is effected by means of the seat and key members shown in Figures 17–20 inclusive and in the manner there described. The cross beam 186 has connected thereto a beam 190 by means of the connection shown in Figure 7. This connection is designated as 192.

While this invention has been described in conjunction with specific embodiments, nevertheless, various changes and modifications obvious to one skilled in the art are within the spirit, scope and contemplation of the present invention.

I claim:

A connection for structural members that comprises an L-shaped seating member defining a slot therein, two triangular plates mounted on one leg of said seating member on opposite sides of said slot, said other leg of said seating member to be mounted on a first structural member, a key member to be mounted on a second structural member received in and extending beyond said slot and having a projection, said triangular plates and projection cooperating with said seating member and key member to define a draw pin hole, and a draw pin positioned in said draw pin hole tending to pull said key member through said slot.

References Cited in the file of this patent

UNITED STATES PATENTS

| | | |
|---|---|---|
| 732,133 | Strobel | June 30, 1903 |
| 1,879,604 | Dillman | Sept. 27, 1932 |
| 1,970,965 | Leake | Aug. 21, 1934 |
| 2,042,179 | Leake | May 26, 1936 |
| 2,231,297 | Saxe | Feb. 11, 1941 |
| 2,562,483 | Bender | July 31, 1951 |